(12) United States Patent
Leal Mesquita et al.

(10) Patent No.: US 10,158,751 B2
(45) Date of Patent: Dec. 18, 2018

(54) PERFORMING A NOTIFICATION EVENT AT A HEADPHONE DEVICE (71) Applicant: INTERNATIONAL BUSINESS MACHINES CORPORATION, Armonk, NY (US)

(72) Inventors: Vitor Henrique Leal Mesquita, São Paulo (BR); Lucas Correia Villa Real, São Paulo (BR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/457,665

(22) Filed: Mar. 13, 2017

(65) Prior Publication Data
US 2018/0262606 A1  Sep. 13, 2018

(51) Int. Cl.
*H04M 1/725* (2006.01)
*G06F 3/16* (2006.01)
*G06F 3/0488* (2013.01)
*G06F 3/0484* (2013.01)
*H04M 1/737* (2006.01)

(52) U.S. Cl.
CPC ........ *H04M 1/7255* (2013.01); *G06F 3/0488* (2013.01); *G06F 3/04842* (2013.01); *G06F 3/165* (2013.01); *H04M 1/72569* (2013.01); *H04M 1/737* (2013.01); *H04M 2201/42* (2013.01); *H04M 2207/18* (2013.01); *H04M 2250/22* (2013.01); *H04M 2250/52* (2013.01)

(58) Field of Classification Search
CPC ........... H04M 1/7255; H04M 1/72569; H04M 1/737; H04M 2201/42; H04M 2207/18; H04M 2250/22; H04M 2250/52; G06F 3/0488; G06F 3/165
See application file for complete search history.

(56) References Cited

U.S. PATENT DOCUMENTS

| 4,827,458 A | 5/1989 | D'Alayer de Costemore D'Arc |
| 8,804,974 B1 | 8/2014 | Melanson |

(Continued)

FOREIGN PATENT DOCUMENTS

JP  2016510234  4/2016

*Primary Examiner* — Nay A Maung
*Assistant Examiner* — Angelica M Perez
(74) *Attorney, Agent, or Firm* — F. Chau & Associates, LLC (57) ABSTRACT

A method of performing a notification event at a headphone device includes receiving, at the headphone device, a wireless notification signal. The wireless notification signal is received from a transmitting device including a camera sensor, a display and a touchscreen interface. The headphone device is selected to receive the wireless notification signal in response to a touchscreen event occurring at the transmitting device. An image including a representation of the headphone device is composed by the camera sensor and is presented on the display. The touchscreen event includes receiving a touch input via the touchscreen interface. The method further includes determining the notification event to be performed at the headphone device by decoding the wireless notification signal. The method further includes performing the notification event indicated by the wireless notification signal at the headphone device in response to receiving the wireless notification signal.

18 Claims, 5 Drawing Sheets

(56) References Cited

U.S. PATENT DOCUMENTS

| | | |
|---|---|---|
| 9,066,176 B2 | 6/2015 | Hendrix et al. |
| 2004/0172252 A1 | 9/2004 | Aoki et al. |
| 2007/0127747 A1 | 6/2007 | Doyle |
| 2009/0232325 A1 | 9/2009 | Lundquist |
| 2014/0072134 A1 | 3/2014 | Po et al. |
| 2014/0146976 A1 | 5/2014 | Rundle |
| 2014/0348367 A1* | 11/2014 | Vavrus ................ H04R 1/1091 381/334 |
| 2015/0035685 A1 | 2/2015 | Strickland et al. |
| 2015/0097719 A1 | 4/2015 | Balachandreswaran et al. |
| 2015/0222977 A1 | 8/2015 | Angel, Jr. |
| 2016/0291687 A1* | 10/2016 | Kasahara ............. G06F 3/0488 |

\* cited by examiner

PERFORMING A NOTIFICATION EVENT AT A HEADPHONE DEVICE

BACKGROUND

Mobile electronic devices, including portable audio systems such as wearable headphone devices, often distract people from their surroundings. For example, it may be difficult to get the attention of a person wearing a headphone device when the volume of the headphone device is high, or when the headphone device includes a noise cancellation feature. As a result, getting a person's attention from short distances can be difficult, and may require waving at that person, calling that person's name out, or walking up to that person to get his or her attention.

SUMMARY

According to an exemplary embodiment of the present invention, a method of performing a notification event at a headphone device includes receiving, by a wireless receiver disposed in the headphone device, a wireless notification signal. The wireless notification signal is received from a transmitting device including a camera sensor, a display and a touchscreen interface. The headphone device is selected to receive the wireless notification signal in response to a touchscreen event occurring at the transmitting device. An image including a representation of the headphone device is composed by the camera sensor and is presented on the display. The touchscreen event includes receiving a touch input via the touchscreen interface. The method further includes determining the notification event to be performed at the headphone device by decoding the wireless notification signal. The method further includes performing, by a processor disposed in the headphone device, the notification event indicated by the wireless notification signal at the headphone device in response to receiving the wireless notification signal.

According to an exemplary embodiment of the present disclosure, a headphone system includes a headphone device. The headphone device includes a speaker, a wireless receiver configured to receive a wireless notification signal, a decoder configured to decode the wireless notification signal, a memory storing a computer program, and a processor configured to execute the computer program. The computer program is configured to determine a notification event to be performed at the headphone device using the decoded wireless notification signal, and perform the notification event indicated by the wireless notification signal at the headphone device in response to the wireless receiver receiving the wireless notification signal.

According to an exemplary embodiment of the present invention, a method of performing a notification event at a headphone device includes composing an image using a camera sensor disposed in a transmitting device. The composed image includes a representation of the headphone device. The method further includes displaying the composed image on a display disposed in the transmitting device, receiving a touch input via a touchscreen interface disposed in the transmitting device, and transmitting, via a wireless transmitter disposed in the transmitting device, a wireless notification signal to the headphone device in response to the touch input being received. The wireless notification signal includes instructions causing the notification event to be performed at the headphone device.

BRIEF DESCRIPTION OF THE DRAWINGS

The above and other features of the present invention will become more apparent by describing in detail exemplary embodiments thereof, with reference to the attached drawings.

DETAILED DESCRIPTION

Exemplary embodiments of the present invention will be described more fully hereinafter with reference to the accompanying drawings. Like reference numerals may refer to like elements throughout the specification and drawings.

According to exemplary embodiments of the present invention, a device equipped with a wireless signal transmitter may be used to provide a notification to a person wearing a headphone device equipped with a wireless receiver. The device equipped with a wireless signal transmitter (referred to herein as a transmitting device) may be, for example, a smartphone. However, the transmitting device is not limited thereto. The person wearing the headphone device may be selected at the transmitting device as a target recipient of a notification via a touchscreen interface included in the transmitting device. For example, the transmitting device may include a camera sensor and a display having a touchscreen interface. The camera sensor may be pointed at the target recipient, and a representation of the target recipient may be tapped on the display using the touchscreen interface, causing a wireless notification signal to be transmitted from the transmitting device to the headphone device. Such an application may be useful in a scenario in which one person is trying to get the attention of another person wearing a headphone device, and the person wearing the headphone device cannot hear the other person due to, for example, a noise cancellation feature of the headphone device, high audio volume, etc. Some exemplary scenarios are listed below. It is to be understood that these scenarios are merely exemplary, and that the present invention is not limited thereto.

An exemplary scenario includes an open office space. For example, a co-worker may be invited to a meeting, but may not hear a call inviting him or her to the meeting as a result of wearing a headphone device that implements noise cancellation. The host of the meeting may send the co-worker a notification (e.g., from the host's smartphone) alerting him or her of the meeting.

An exemplary scenario includes a conference call. For example, in an international conference, attendees may be listening to translated audio through headphone devices, and it may be difficult to get the attention of attendees due to the headphone devices. Exemplary embodiments of the present invention may be used to allow specific attendees to be "pinged" by other attendees sitting nearby to get their attention without interrupting other attendees.

An exemplary scenario includes transmitting notifications from a vehicle to pedestrians. In an exemplary embodiment, the transmitting device may be a vehicle such as a car, which includes a wireless transmitter. In an exemplary embodiment, a wireless notification may be automatically transmitted from the vehicle to a location in front of the vehicle when the horn on the car is honked. As a result, any pedestrian in front of the vehicle wearing a headphone device equipped with the wireless receiver will be alerted of the vehicle's presence when the horn is honked (e.g., audio playback on the headphone device(s) may be muted, allowing the pedestrian(s) to hear the horn honking). In an exemplary embodiment, the vehicle may include a camera sensor, as well as a display and a touchscreen interface (e.g., in the console of the vehicle), and a specific pedestrian may be selected as the target recipient in response to the driver tapping the pedestrian on the display.

An exemplary scenario includes augmented reality (AR) games. For example, in an AR game played on a device including a camera sensor, a display and a touchscreen interface (e.g., a smartphone), messages and notifications may be transmitted from a transmitting device to a receiving device via a user pointing the transmitting device (e.g., the smartphone) at the target recipient and tapping the display while the smartphone is aimed at the target recipient. In an exemplary embodiment, a message or notification may be transmitted from the transmitting device to a headphone device worn by another player. In an exemplary embodiment, a message or notification may be transmitted from the transmitting device to a device used by the other player other than the headphone device (e.g., a message or notification may be sent to another player's smartphone and displayed on the smartphone's display, or audibly provided to the other player via a speaker of the smartphone, rather than being audibly provided to the other player via a headphone device).

Figure 1:
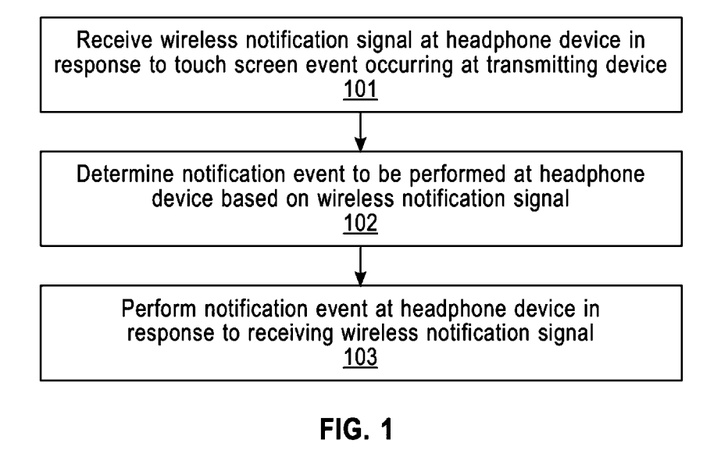
FIG. 1 illustrates a method of performing a notification event at a headphone device, according to an exemplary embodiment of the present invention.

FIG. 1 illustrates a method of performing a notification event at a headphone device, according to an exemplary embodiment of the present invention.

Referring to FIG. 1, in an exemplary embodiment, a wireless notification signal is received by a headphone device at block 101. The headphone device includes a wireless receiver. The wireless notification signal is transmitted from a wireless transmitter of a transmitting device to the wireless receiver of the headphone device. Herein, the wireless transmitter and the wireless receiver are described as respectively being an infrared (IR) transmitter and an IR receiver. However, the present invention is not limited thereto. For example, the wireless transmitter and the wireless receiver may utilize a variety of wireless protocols.

According to exemplary embodiments, the transmitting device is an electronic device that includes at least the wireless transmitter, a camera sensor, a display and a touchscreen interface. The transmitting device may be, for example, a smartphone. The headphone device is selected to receive the wireless notification signal in response to a touchscreen event occurring at the transmitting device.

For example, to select a headphone device as a target to receive the wireless notification, a user of the transmitting device may aim the transmitting device at the headphone device such that the camera sensor composes an image that includes the headphone device. The wireless transmitter may be disposed near the camera sensor, such that the wireless transmitter is aimed in the same general direction as the camera sensor when the image is composed. Herein, the term "compose" refers to the camera sensor rendering/displaying the current environment detected by the camera sensor (e.g., in real-time) to the user via the display of the transmitting device. Composing an image does not necessarily include "capturing" the image. For example, composing an image does not require that the image be captured and stored on a memory of the transmitting device (although image capture may occur in some exemplary embodiments). Rather, composing an image may include pointing the transmitting device in a direction while the camera sensor is active (e.g., without capturing and storing an image), such that the user is presented with a real-time view of the environment at which the camera sensor (and the wireless transmitter) is directed.

The user of the transmitting device may point the camera sensor at another user wearing the headphone device. As a result, the camera sensor composes an image that includes a representation of the headphone device (since the headphone device is within the field of view of the camera sensor). The image is rendered/displayed on the display of the transmitting device. The user may tap the display including the touchscreen interface of the transmitting device to initiate transmission of a wireless notification to the headphone device. That is, the user may select the headphone device as the target recipient to receive the wireless notification by providing a touch input via the touchscreen interface when the headphone device is displayed in the composed image, and thus, when the wireless transmitter of the transmitting device is aligned with the wireless receiver of the headphone device.

The wireless notification is transmitted from the transmitting device to the headphone device in response to the user providing a touch input at the transmitting device. This touch input may be referred to herein as a touchscreen event. Since the wireless notification is transmitted in response to the touchscreen event, and since the transmitting device is aimed at the headphone device when the touchscreen event occurs, the transmitting device is aligned with the headphone device at the time of transmission. As a result, an IR signal transmitted from the IR transmitter of the transmitting device may be received by the IR receiver of the headphone device. The touch input may be received in an area of the composed image corresponding to the location of the target user (e.g., the user of the transmitting device may tap on the target recipient to initiate transmission of the wireless notification signal to the headphone device worn by the target recipient). For example, the touchscreen event may include receiving a touch input via the touchscreen interface in an area of the composed image at which the representation of the headphone device is located.

Exemplary embodiments of the present invention may utilize a wireless protocol, such as infrared, that operates based on line of sight. That is, exemplary embodiments may utilize a wireless protocol in which communication between the transmitter and receiver occurs via a visually unobstructed straight line through space between the transmitter and the receiver. As a result, the transmitting device may transmit the wireless notification signal to various different headphone devices based on the direction in which the user points the camera sensor of the transmitting device. For example, if a plurality of headphone devices are in a room, a user may aim the transmitting device at any one of the headphone devices to transmit the wireless notification to the desired headphone device. When a wireless protocol that operates based on line of sight is utilized, only the headphone device that the transmitting device is aimed at will receive the wireless notification.

Referring back to FIG. 1, a notification event to be performed at the headphone device is determined at block 102. For example, the wireless notification signal includes instructions defining a specific notification event that is to be performed at the headphone device when the headphone device receives the wireless notification signal. Instructions included in the wireless notification signal may be encoded, for example, by an encoder disposed in the transmitting device, and may be decoded, for example, by a decoder disposed in the headphone device. The encoder and decoder may be implemented using hardware and/or software. In response to receiving the wireless notification signal, a processor disposed in the headphone device performs the notification event indicated by the wireless notification signal at the headphone device at block 103.

Various protocols and methods may be used to encode and decode the instructions included in the wireless notification signal. For example, in an exemplary embodiment, a data packet sent by the wireless transmitter disposed in the transmitting device may include a transmitter ID that identifies the transmitting device, a notification type ID that indicates the type of notification to be performed, and an optional payload (e.g., an MP3 stream). The data packet may be compressed using, for example, variable-length (varint) encoding. In addition, the data packet may be optionally encrypted using a private key corresponding to the transmitter ID). When encryption is utilized, upon receiving the wireless notification signal, the processor disposed in the headphone device may check to determine whether the transmitting device is a trusted device. Upon confirming that the transmitting device is trusted, the processor in the headphone device may then decrypt the data packet. In this embodiment, a configuration interface may be provided to the user of the headphone device to allow the user to manage trusted transmitting devices (e.g., based on the transmitting devices' public keys). It is to be understood that the encoding/decoding and the encryption/decryption schemes described above are exemplary, and that the present invention is not limited thereto.

The notification event performed at the headphone device may include a variety of different types of notifications. For example, the notification event may include playing a notification sound such as, for example, a beep, chime, bell, or custom audio stream, at the headphone device. Alternatively, the notification event may include temporarily muting audio playback at the headphone device without playing a sound. The audio may be muted for a predetermined amount of time as set by the user of the headphone device or the user of the transmitting device.

When the notification event includes playing a notification sound rather than only muting audio playback at the headphone device, the notification sound may be played over the audio currently being played on the headphone device. The notification sound may be played at a higher volume than the current audio to get the attention of the user.

Alternatively, audio playback may be temporarily muted at the headphone device while the notification sound is being played. For example, the notification event may include muting audio playback at the headphone device, playing the notification sound at the headphone device while the audio playback is muted, and resuming audio playback at the headphone device after playing the notification sound. The length of time that the audio playback is muted may vary according to user settings. For example, audio playback may be muted shortly before the notification sound is played, and may resume shortly after the notification sound is done playing (e.g., there may be little or no silence between audio playback and the notification sound). Alternatively, audio playback may remain muted for a predetermined amount of time after the notification sound is done playing.

In an exemplary embodiment, the notification event includes playing an audible phrase at the headphone device. The audible phrase may be a prerecorded phrase, or may be a custom phrase recorded by the user of the transmitting device. For example, the transmitting device may include a microphone, and the user of the transmitting device may record an audible phrase using the microphone. Once recorded, the audible phrase may be transmitted to the headphone device as the notification sound.

Figure 2:
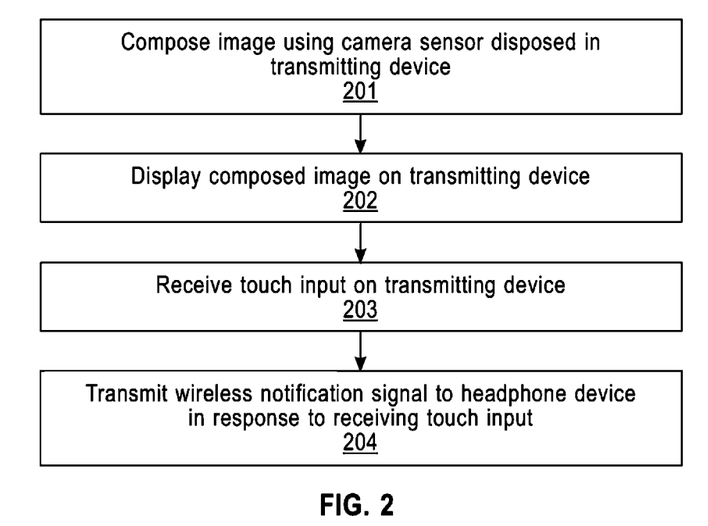
FIG. 2 illustrates a method of performing a notification event at a headphone device, according to an exemplary embodiment of the present invention.

FIG. 2 illustrates a method of performing a notification event at a headphone device, according to an exemplary embodiment of the present invention.

Referring to FIG. 2, in an exemplary embodiment, an image is composed using a camera sensor disposed in a transmitting device at block 201. As described above, the composed image includes a representation of the headphone device. Once the image is composed, the composed image is displayed on a display of the transmitting device at block 202. At block 203, a touch input is received via a touchscreen interface disposed in the transmitting device. In response to receiving the touch input, a wireless notification signal is transmitted from the transmitting device to the headphone device at block 204. As described above, the wireless notification signal may be transmitted from a wireless transmitter (e.g., an IR transmitter) disposed in the transmitting device to a wireless receiver (e.g., an IR receiver) disposed in the headphone device. The wireless notification signal includes instructions causing the notification event to be performed at the headphone device.

Figure 3:
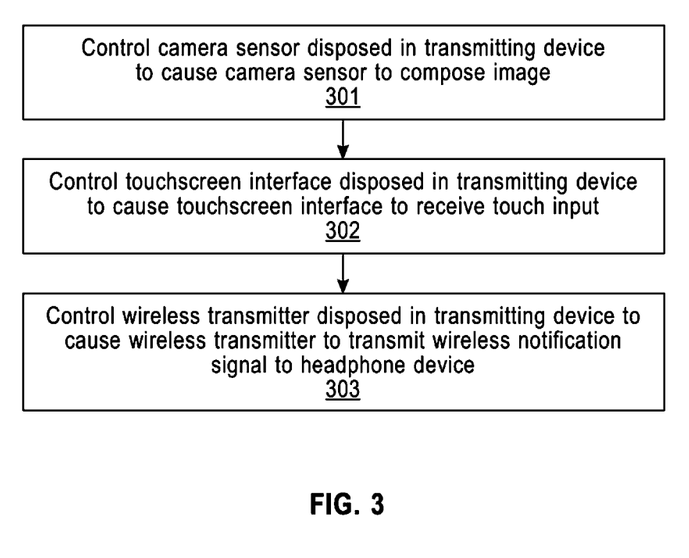
FIG. 3 illustrates a method of performing a notification event at a headphone device, according to an exemplary embodiment of the present invention.

FIG. 3 illustrates a method of performing a notification event at a headphone device, according to an exemplary embodiment of the present invention.

Referring to FIG. 3, in an exemplary embodiment, a method of performing a notification event at a headphone device includes utilizing a processor to control a camera sensor disposed in a transmitting device to cause the camera sensor to compose an image at block 301. The method further includes utilizing the processor to control a touchscreen interface disposed in the transmitting device to cause the touchscreen interface to receive a touch input at block 302 when a user touches the touchscreen interface. The method further includes utilizing the processor to control a wireless transmitter disposed in the transmitting device to cause the wireless transmitter to transmit a wireless notification signal from the transmitting device to the headphone device in response to the touch input being received at block 303.

Figure 4:
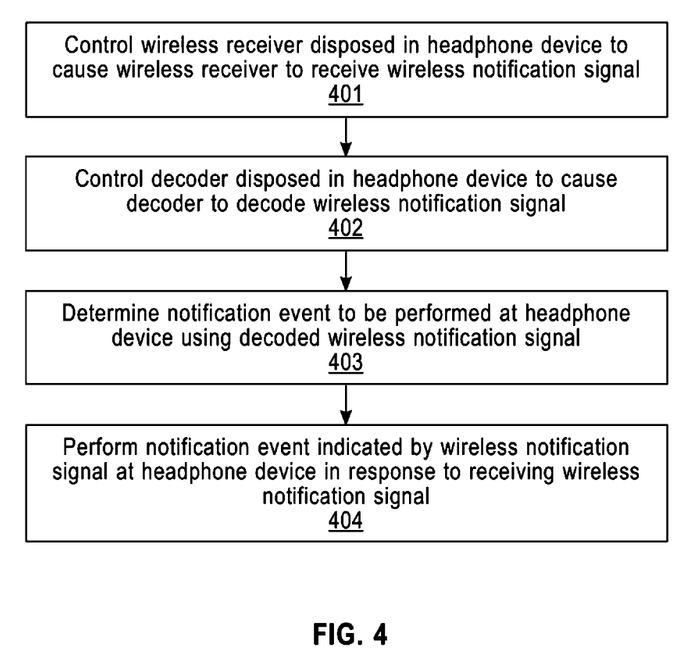
FIG. 4 illustrates a method of performing a notification event at a headphone device, according to an exemplary embodiment of the present invention.

FIG. 4 illustrates a method of performing a notification event at a headphone device, according to an exemplary embodiment of the present invention.

Referring to FIG. 4, in an exemplary embodiment, a method of performing a notification event at a headphone device includes utilizing a processor to control a wireless receiver disposed in the headphone device to cause the wireless receiver to receive a wireless notification signal at block 401. As described above, the wireless notification signal is received from a transmitting device including a camera sensor, and the headphone device is selected to receive the wireless notification signal using an image composed by the camera sensor that includes a representation of the headphone device. The method further includes utilizing the processor to control a decoder disposed in the headphone device to cause the decoder to decode the wireless notification signal at block 402, determine the notification event to be performed at the headphone device using the decoded wireless notification signal at block 403, and perform the notification event indicated by the wireless notification signal at the headphone device in response to receiving the wireless notification signal at block 404.

Figure 5:
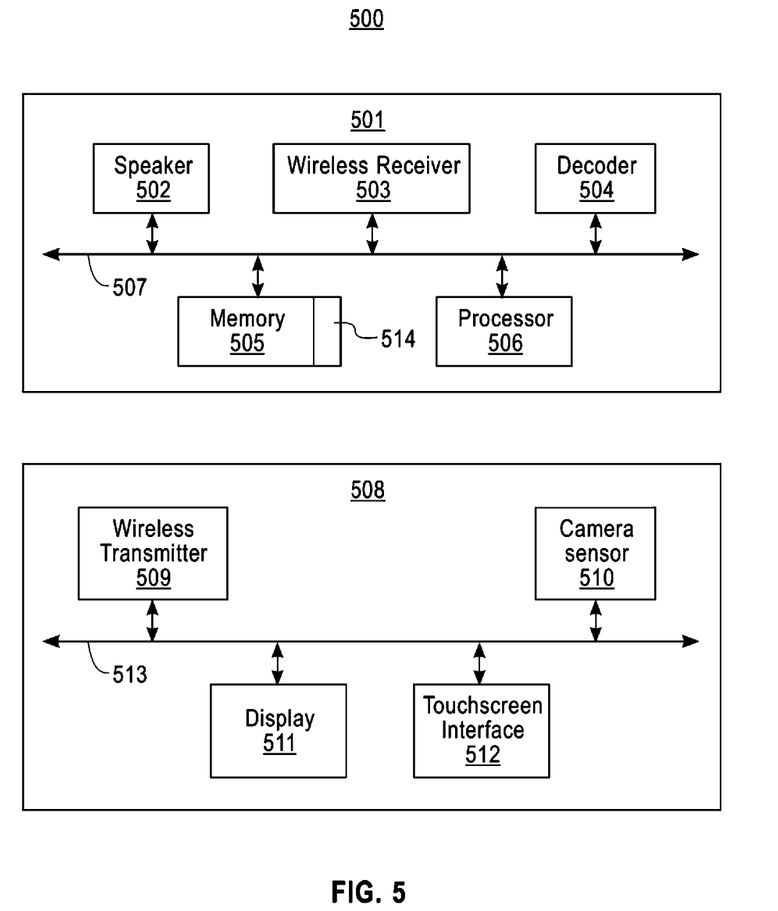
FIG. 5 illustrates a block diagram of a headphone system according to an exemplary embodiment of the present invention.

FIG. 5 illustrates a block diagram of a headphone system according to an exemplary embodiment of the present invention.

Referring to FIG. 5, in an exemplary embodiment, a headphone system 500 includes a headphone device 501. The headphone device 501 may include at least one speaker 502, at least one wireless receiver 503, a decoder 504, a memory 505, and a processor 506. The at least one speaker 502, the at least one wireless receiver 503, the decoder 504, the memory 505, and the processor 506 may communicate with one another via a data bus 507. The headphone device 501 may be embodied in a variety of different forms. For example, the headphone device 501 may be a wireless headphone device (e.g., that connects to a source device via a wireless connection such as, for example, BLUETOOTH), or a wired headphone device (e.g., that connects to a source device via a wired connection). The headphone device 501 may be, for example, over-the-ear headphones, in-ear headphones or earbuds, etc. The headphone device 501 may include a single physical structure including two speakers 502 respectively disposed in or on opposite ears, or may include two physically separable structures respectively housing two speakers 502 disposed in or on opposite ears (e.g., wireless earbuds). In this embodiment, the two speakers 502 may wirelessly communicate with each other to provide audio to the user in a synchronized manner.

The at least one speaker 502 is configured to play audio, including the notification sounds described above. The at least one wireless receiver 503 is configured to receive a wireless notification signal. For example, as described above, the at least one wireless receiver 503 may receive a wireless notification signal from a transmitting device in response to a touchscreen event occurring at the transmitting device. The decoder 504 is configured to decode the wireless notification signal once the signal has been received by the headphone device 501. The memory 505 stores a computer program 514. The processor 506 controls the components of the headphone device 501, and is configured to execute the computer program 514. The computer program 514, when executed by the processor 506, determines a notification event to be performed at the headphone device using the decoded wireless notification signal, and performs the notification event indicated by the wireless notification signal at the headphone device 501 in response to the at least wireless receiver 503 receiving the wireless notification signal.

The at least one wireless receiver 503 may be, for example, an IR receiver. Exemplary embodiments may include a plurality of wireless receivers 501 disposed at different locations on the headphone device 501. Disposing multiple wireless receivers 501 at different locations on the headphone device 501 may improve the ability of the headphone device 501 to receive the wireless notification signal from the transmitting device.

For example, disposing a wireless receiver 503 on each of the front and back of the headphone device 501 may improve the ability of the headphone device 501 to receive the wireless notification signal when the user is facing toward or away from the transmitting device. Similarly, disposing a wireless receiver 503 on each side (e.g., near each speaker) of the headphone device 501 may improve the ability of the headphone device 501 to receive the wireless notification signal when either side of the user is facing the transmitting device.

Figure 6:
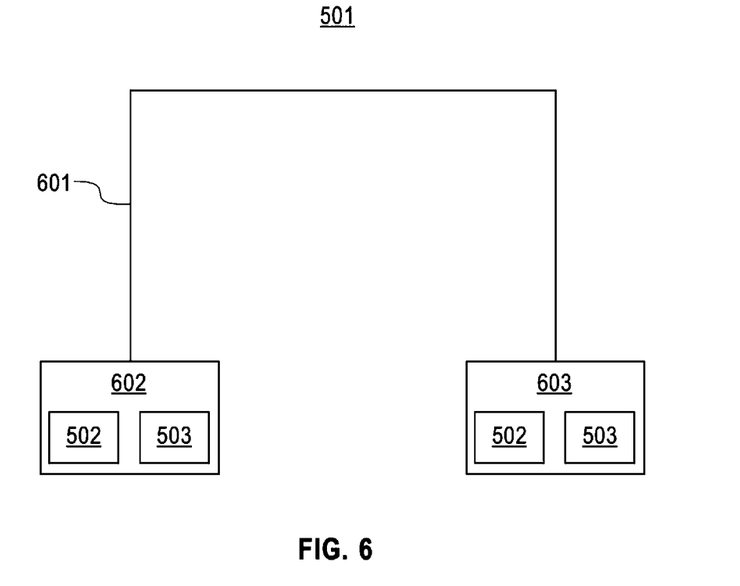
FIG. 6 illustrates a block diagram of a headphone device according to an exemplary embodiment of the present invention.

For example, referring to FIG. 6, when the headphone device 501 is a single physical structure including a band 601 extending over or around a user's head or neck, and two speaker housing compartments 602, 603 (each including a speaker 502) attached to the band 601 and disposed near the user's ears when worn, a wireless receiver 503 may be disposed on each speaker housing compartment 602, 603 (e.g., two wireless receivers 503 may be disposed on opposite sides of the headphone device 501). In exemplary embodiments, the two wireless receivers 503 are not limited to being disposed on speaker housing compartments. Rather, two wireless receivers 503 may be disposed on any two opposing portions of the headphone device 501 such that the capability of the headphone device 501 to receive the wireless notification signal from different angles is improved (e.g., wireless receivers 503 may be disposed on opposing sides of a band of the headphone device 501, on opposing sides of a single speaker housing compartment of the headphone device 501, etc.). When the headphone device 501 includes two physically separable speakers (e.g., wireless earbuds that are not physically connected to each other), each speaker (e.g., each earbud) may include a wireless receiver 503.

The headphone system 500 may include a transmitting device 508. As described above, the transmitting device transmits a wireless notification signal to the headphone device 501 in response to a touchscreen event occurring at the transmitting device 508. The transmitting device 508 may be, for example, a smartphone. The transmitting device 508 includes a wireless transmitter 509, a camera sensor 510, a display 511, and a touchscreen interface 512. The wireless transmitter 509, the camera sensor 510, the display 511, and the touchscreen interface 512 communicate with one another via a data bus 513. The wireless transmitter may be, for example, an IR transmitter that transmits an IR signal. The touchscreen interface 512 is an input device layered on top of the display 511 that is capable of receiving input from a user via the user touching the display 511. The touchscreen interface 511 is utilized to detect the touchscreen event that occurs at the transmitting device 508. The touchscreen interface 512 may be, for example, a capacitive touchscreen interface, a resistive touchscreen interface, etc.

The block diagram of the headphone system 500 shown in FIG. 5 is for illustrative purposes. It is to be understood that the headphone device 501 and the transmitting device 508 described with reference to FIG. 5 may include additional components not illustrated in the block diagram of FIG. 5.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the present invention has been particularly shown and described with reference to exemplary embodiments thereof, it will be understood by those of ordinary skill in the art that various changes in form and detail may be made therein without departing from the spirit and scope of the present invention as defined by the following claims.

What is claimed is:

1. A method of performing a notification event at a headphone device, comprising:
   receiving, by a wireless receiver disposed in the headphone device, a wireless notification signal, wherein the headphone device is worn by a first user,
   wherein the wireless notification signal is received from a transmitting device comprising a camera sensor, a display and a touchscreen interface, and the headphone device is selected to receive the wireless notification signal in response to a touch input provided via the touchscreen interface,
   wherein an image including a representation of the headphone device is composed by the camera sensor and is presented on the display, and the touch input is provided as a result of a second user, different from the first user, touching the representation of the headphone device in the composed image presented on the display;

determining the notification event to be performed at the headphone device by decoding the wireless notification signal; and performing, by a processor disposed in the headphone device, the notification event indicated by the wireless notification signal at the headphone device in response to receiving the wireless notification signal.

2. The method of claim 1, wherein the wireless notification signal is decoded by a decoder disposed in the headphone device.

3. The method of claim 1, wherein performing the notification event comprises playing a notification sound at the headphone device.

4. The method of claim 1, wherein performing the notification event comprises temporarily muting audio playback at the headphone device for a predetermined amount of time.

5. The method of claim 1, wherein performing the notification event comprises:
    muting audio playback at the headphone device;
    playing a notification sound at the headphone device while the audio playback is muted; and
    resuming the audio playback at the headphone device after playing the notification sound.

6. The method of claim 1, wherein performing the notification event comprises:
    playing an audible phrase at the headphone device,
    wherein the audible phrase is recorded by a microphone disposed in the transmitting device, and the audible phrase is received by the wireless receiver from the transmitting device.

7. The method of claim 1, wherein the wireless receiver is an infrared (IR) receiver, and the wireless notification signal is an infrared signal.

8. The method of claim 1, wherein the transmitting device is a smartphone.

9. A headphone system, comprising:
    a headphone device, comprising:
        a speaker;
        a first wireless receiver configured to receive a wireless notification signal;
        a second wireless receiver configured to receive the wireless notification signal, wherein the first and second wireless receivers are disposed on opposite sides of the headphone device;
        a decoder configured to decode the wireless notification signal;
        a memory storing a computer program; and
        a processor configured to execute the computer program, wherein the computer program is configured to:
            determine a notification event to be performed at the headphone device using the decoded wireless notification signal; and
            perform the notification event indicated by the wireless notification signal at the headphone device in response to the wireless receiver receiving the wireless notification signal.

10. The headphone system of claim 9, further comprising:
    a transmitting device comprising a wireless transmitter, a camera sensor, a display and a touchscreen interface,
    wherein the headphone device is worn by a first user,
    wherein the headphone device is selected to receive the wireless notification signal in response to a touch input provided via the touchscreen interface,
    wherein an image including a representation of the headphone device is composed by the camera sensor and is presented on the display, and the touch input is provided as a result of a second user, different from the first user, touching the representation of the headphone device in the composed image presented on the display.

11. The headphone system of claim 10, wherein the transmitting device is a smartphone.

12. The headphone system of claim 9, wherein the wireless receiver is an infrared (IR) receiver.

13. A method of performing a notification event at a headphone device, comprising:
    composing an image using a camera sensor disposed in a transmitting device, wherein the composed image includes a representation of the headphone device, and the headphone device is worn by a first user;
    displaying the composed image on a display disposed in the transmitting device;
    receiving a touch input via a touchscreen interface disposed in the transmitting device, wherein the touch input is received as a result of a second user, different from the first user, touching the representation of the headphone device in the composed image displayed on the display; and
    transmitting, via a wireless transmitter disposed in the transmitting device, a wireless notification signal to the headphone device in response to the touch input being received,
    wherein the wireless notification signal includes instructions causing the notification event to be performed at the headphone device.

14. The method of claim 13, wherein the wireless notification comprises playing a notification sound at the headphone device.

15. The method of claim 13, wherein the notification event comprises temporarily muting audio playback at the headphone device for a predetermined amount of time.

16. The method of claim 13, wherein the notification event comprises:
    muting audio playback at the headphone device;
    playing a notification sound at the headphone device while the audio playback is muted; and
    resuming the audio playback at the headphone device after playing the notification sound.

17. The method of claim 13, wherein the notification event comprises:
    playing an audible phrase at the headphone device,
    wherein the audible phrase is recorded by a microphone disposed in the transmitting device, and the audible phrase is transmitted to a wireless receiver of the headphone device from the wireless transmitter.

18. The method of claim 13, wherein the wireless receiver is an infrared (IR) receiver, and the wireless notification signal is an infrared signal.

* * * * *